(12) United States Patent
Uotani

(10) Patent No.: US 7,936,335 B2
(45) Date of Patent: May 3, 2011

(54) OPERATION DIRECTION JUDGING METHOD FOR OPERATION KEY IN DIRECTION DETECTING SWITCH

(75) Inventor: Toshiaki Uotani, Mitsuke (JP)

(73) Assignee: Sunarrow Ltd., Tokyo (JP)

( * ) Notice: Subject to any disclaimer, the term of this patent is extended or adjusted under 35 U.S.C. 154(b) by 826 days.

(21) Appl. No.: 11/794,133

(22) PCT Filed: Dec. 22, 2005

(86) PCT No.: PCT/JP2005/024174
§ 371 (c)(1),
(2), (4) Date: Nov. 27, 2007

(87) PCT Pub. No.: WO2006/070898
PCT Pub. Date: Jul. 6, 2006

(65) Prior Publication Data
US 2008/0170035 A1    Jul. 17, 2008

(30) Foreign Application Priority Data

Dec. 27, 2004   (JP) .................................. 2004-378225

(51) Int. Cl.
*G06F 3/033* (2006.01)
(52) U.S. Cl. ......................... 345/160; 345/157; 345/159
(58) Field of Classification Search .......... 345/156–172; 341/33; 200/1 R–5 F
See application file for complete search history.

(56) References Cited

U.S. PATENT DOCUMENTS 5,504,502 A * 4/1996 Arita et al. .................... 345/160
5,691,517 A * 11/1997 Yamamoto et al. ........... 200/6 A (Continued)

FOREIGN PATENT DOCUMENTS

JP     2000-208001     7/2000

(Continued)

OTHER PUBLICATIONS

International Search Report, Feb. 24, 2006. International Preliminary Report on Patentability, Jul. 3, 2007.

*Primary Examiner* — Amare Mengistu
*Assistant Examiner* — Hong Zhou
(74) *Attorney, Agent, or Firm* — Hedman & Costigan, P.C.; James V. Costigan

(57) ABSTRACT

An object of the present invention is to provide a directionality judging method for an operation key in a direction detecting switch, capable of detecting a key operation in any direction; and superior as the cursor can be freely moved by one operation key.

The present invention is a directionality judging method for an operation key comprising; wherein an initial value is set whose unit is a minimum division region as a criterion for specifying the operation direction of the operation key from the input signal, and a position of the operation key at a time when it is pressed is detected from the input signal and the operation direction is stored in a memory; and next, an effective operation range comprising the plurality of regions of minimum division regions including the operation direction of the operation key is set in a controller; an operation of the operation key whose state is in the effective operation range is judged to be the same direction; and for an operation at a position at which the operation key deviates from the effective operation range, a new operation direction at the deviating position and an effective operation range are set.

4 Claims, 10 Drawing Sheets

U.S. PATENT DOCUMENTS

| | | |
|---|---|---|
| 2003/0030452 A1 | 2/2003 | Okada et al. |
| 2003/0210234 A1* | 11/2003 | Seya .......................... 345/172 |
| 2004/0020704 A1 | 2/2004 | Sunda et al. |
| 2004/0113955 A1 | 6/2004 | Kosugi |
| 2004/0160235 A1* | 8/2004 | Okada et al. ................. 324/681 |

FOREIGN PATENT DOCUMENTS

| | | |
|---|---|---|
| JP | 2001-324397 | 11/2001 |
| JP | 2002-107245 | 4/2002 |
| JP | 2003-173233 | 6/2003 |
| JP | 2004-246599 | 9/2004 |

* cited by examiner (a)

(b)

(c)

OPERATION DIRECTION JUDGING METHOD FOR OPERATION KEY IN DIRECTION DETECTING SWITCH

BACKGROUND OF THE INVENTION

1. Field of the Invention

The present invention relates to an operation direction judging method for an operation key in a direction detecting switch, in which an operation direction of an operation key is stored using a direction detecting switch of a portable terminal device, such as a portable telephone, or another electronic terminal device, the same direction is indicated in an effective operation range including the specified operation direction, and a new operation direction and an effective operation range including the new operation direction can be set for an operation of the operation key which deviates from the former effective operation range.

2. Description of the Related Art

In determination of operation direction of an operation key in a conventional portable information terminal, in a portable information terminal in which a cursor being displayed on a display unit is moved by an operation key capable of being omnidirectionally operated, when an operation direction of an operation key is detected by a direction detecting unit, a controller converts the operation direction detected by the direction detecting unit, into a specific movement direction in accordance with movable directions of the cursor displayed on an operation direction display unit, and controls the movement of the cursor on the display unit. Thereby, even when the operation key is operated in any direction, the cursor is moved only in the movable direction displayed on the operation direction display unit (see Patent Document 1: [0036] of the specification of JP-A-2003-44204).

In addition, in the above Patent Document 1, the controller controls the movement of the cursor displayed on the display unit, by referring to a direction conversion table. By displaying the direction conversion table on the display unit or by making user edition or the like possible for the contents of the direction conversion table, the usability is more improved and the operability can be improved (see Patent Document 1: [0037] of the specification of JP-A-2003-44204).

In the above Patent Document 1, one of cursor movable direction patterns is selected from the direction conversion table by a display switch key, and it is provided for the movement control of the cursor by the controller. Thereby, arbitrary selection out of a plurality of kinds of cursor movable direction patterns becomes possible, and a user can set a movable direction or a movement speed of the cursor in accordance with the intended use, the contents of the display screen, and so on. Thus, the usability and the operability can be improved (see Patent Document 1: [0038] of the specification of JP-A-2003-44204).

Further, in the above Patent Document 1, by selecting a movable direction of the cursor displayed on the operation direction display unit, by using the display switch key or the like as movable direction selecting means, the user can specify the movable direction of the cursor in accordance with the intended use, the contents of the display screen, and so on. Thus, the usability and the operability can be improved (see Patent Document 1: [0039] of the specification of JP-A-2003-44204).

Furthermore, in the above Patent Document 1, by using a specific key, such as the display switch key or a determination key, as operation means, the movement speed of the cursor on the display unit may be changed in accordance with the operation time or the operation times of the specific key. For example, if movement speed data is added to the direction conversion table such that the cursor is moved at a high speed within switched directions when the display switch key is depressed in a fixed time or more or double-clicked when the direction display on the operation direction display unit is switched by the display switch key, not only the setting of the movement direction but also the setting of the movement speed of the cursor can be changed. Thereby, the movement speed of the cursor can be changed, for example, a rapid operation is made in accordance with the intended purpose, the contents of the display screen, and so on, or a slow operation is made for delicate positional adjustment of the cursor. Thus, a portable information terminal better in usability and superior in operability can be realized (see Patent Document 1: [0040] of the specification of JP-A-2003-44204).

This prior art is a method in which the cursor can be moved only in movable directions displayed on the operation direction display unit even when the operation key is operated in any direction. Thus, the operation direction must be converted into a specific movement direction, and troublesome operations due to a change in direction are required. That is, a change in direction must be made by displaying the direction conversion table on the display unit or carrying out user edition for the contents of the direction conversion table.

In addition, in the direction detecting switch, even if the operation direction is divided into any number of directions, as eight directions, sixteen directions, thirty-two directions, . . . , there are inevitably portions existing between neighboring two directions and belonging to neither direction. In the case that the direction detecting switch is an eight-direction key, for example, even when an operator intends to operate the "right direction" but the operated position is somewhat shifted and a portion sandwiched by the right direction and the upper right direction and belonging to neither direction is operated, the operated direction may be detected as the upper right direction and an operation may be made that is different from the intention of the operator. In such a case, the operator feels that the direction detecting switch is erroneously operating.

In consideration of the above points, an object of the present invention is to provide an operation direction judging method for an operation key in a direction detecting switch, capable of detecting a key operation in any direction in 360 degrees; increased in convenience of operability as an effective operation range is automatically set when a specific operation direction is determined by a depressing operation of the operation key, the same operation direction is maintained as far as the operation key is depressed within the effective operation range, a new operation direction can be automatically set when the operation key is depressed at a portion which deviates from the effective operation range, and a new effective operation range can be automatically set with the new operation direction is put at the center; and superior as the cursor can be freely moved by one operation key.

SUMMARY OF THE INVENTION

An operation direction judging method for an operation key in a direction detecting switch according to the present invention comprises a movable electrode disposed so as to be movable in accordance with an operation of an omnidirectionally operable operation key; and fixed electrodes dividedly disposed so as to be opposite to the movable electrode; direction detection information on the operation direction, operation speed of the operation key being obtained by detecting as an input signal a capacitance between the movable electrode and the fixed electrodes, 360 degrees are divided into plural minimum division regions as a criterion for judging the operation direction of the operation key from the said input signal, an initial value for judging the operation direction of the operation key is set assigning the direction to the said divided minimum division regions, an operation position of the operation key is detected from the input signal, a direction assigned to the minimum division regions corresponding to the said detected operation position at the initial value is judged as a first operation direction operated by the said operation key, the said first operation direction is stored in a memory, next, the first effective operation range comprising the plural minimum division regions obtained by dividing 360 degrees including the first operation direction is set in a controller, and the judgment region judged as the first operation direction is enlarged; an operation direction of the operation key whose operation position is in the first effective operation range is judged to be the same direction to the first operation direction stored in the said memory; and for an operation position of the operation key at a position at which the operation key deviates from the said first effective operation range, a direction assigned to the minimum division regions corresponding to the operation position at which the operation key deviates is judged as a second operation direction of the operation key at the deviated operation position, the second effective operation range comprising the above mentioned plural minimum division regions including the judged second operation direction is set in the said controller, and a judgment region judged as the second operation direction is enlarged, an operation direction of the operation key whose operation position is in the second effective operation range is judged to be the same direction to the second operation direction comprising the plurality of regions of minimum division regions including the operation direction of the operation key is set in a CPU as a controller; an operation of the operation key whose state is in the effective operation range is judged to be the same direction; and for an operation at a position at which the operation key deviates from the effective operation range, a new operation direction at the deviating position and an effective operation range are set.

In the operation direction judging method for the operation key in a direction detecting switch according to the present invention, when a specific operation direction is determined by a depressing operation of the operation key, the effective operation range is automatically set. The same operation direction is maintained as far as the operation key is operated within the effective operation range. When the operation key is operated at a position which deviates from the effective operation range, a new operation direction is automatically set, a new judgment region of the operation direction is enlarged whereby a new effective operation range can be automatically set. Thus, the convenience of the operability is increased.

The operation direction judging method for an operation key in a direction detecting switch of an operation key according to the present invention is characterized in that directions that the direction detecting switch recognizes are eight directions of upper, lower, left and right directions and intermediate directions of them, and the said effective operation range is a region of less than 90 degrees at the maximum.

In the operation direction judging method for an operation key in a direction detecting switch according to the present invention, direction detection in any operation direction in 360 degrees is possible, a case wherein an operator recognizes as an erroneous operation becomes little, and stable operation as an eight-direction switch can be expected.

The operation direction judging method for an operation key in a direction detecting switch according to the present invention is characterized in that the said second effective operation range is set around the said second operation direction.

In the operation direction judging method for an operation key in a direction detecting switch according to the present invention, even in the case that the operation key at a position which deviates from a portion of a predetermined operation direction is pressed when an operator presses the operation key, or the like, it is possible to surely indicate the predetermined operation direction, a case wherein the operator recognizes as an erroneous operation also becomes little, and a wandering operation during operation can be eliminated.

The operation direction judging method for an operation key in a direction detecting switch according to the present invention is characterized in that also in a direction 180 degrees opposite to the said first effective operation range, the third effective operation range comprising plural minimum division regions including direction 180 degrees opposite to the said first operation direction is set in the said controller, and a judgment region judged as the direction 180 degrees opposite to the said first operation direction is enlarged, an operation direction of the operation key whose operation position is in the third effective operation range is judged to be the same direction to the direction 180 degrees opposite to the first operation direction.

In the operation direction judging method for an operation key in a direction detecting switch according to the present invention, in the case that a direction different from the operation of the last time is operated, even in the case that an operation in the direction 180 degrees opposite to the already set effective operation range highest in the probability is performed, it is possible to surely indicate the predetermined operation direction, and a wandering operation during operation of the operator can be eliminated.

DESCRIPTION OF THE PREFERRED EMBODIMENTS

Hereinafter, an embodiment of an operation direction judging method for an operation key in a direction detecting switch according to the present invention will be described with reference to drawings.

Figure 1:
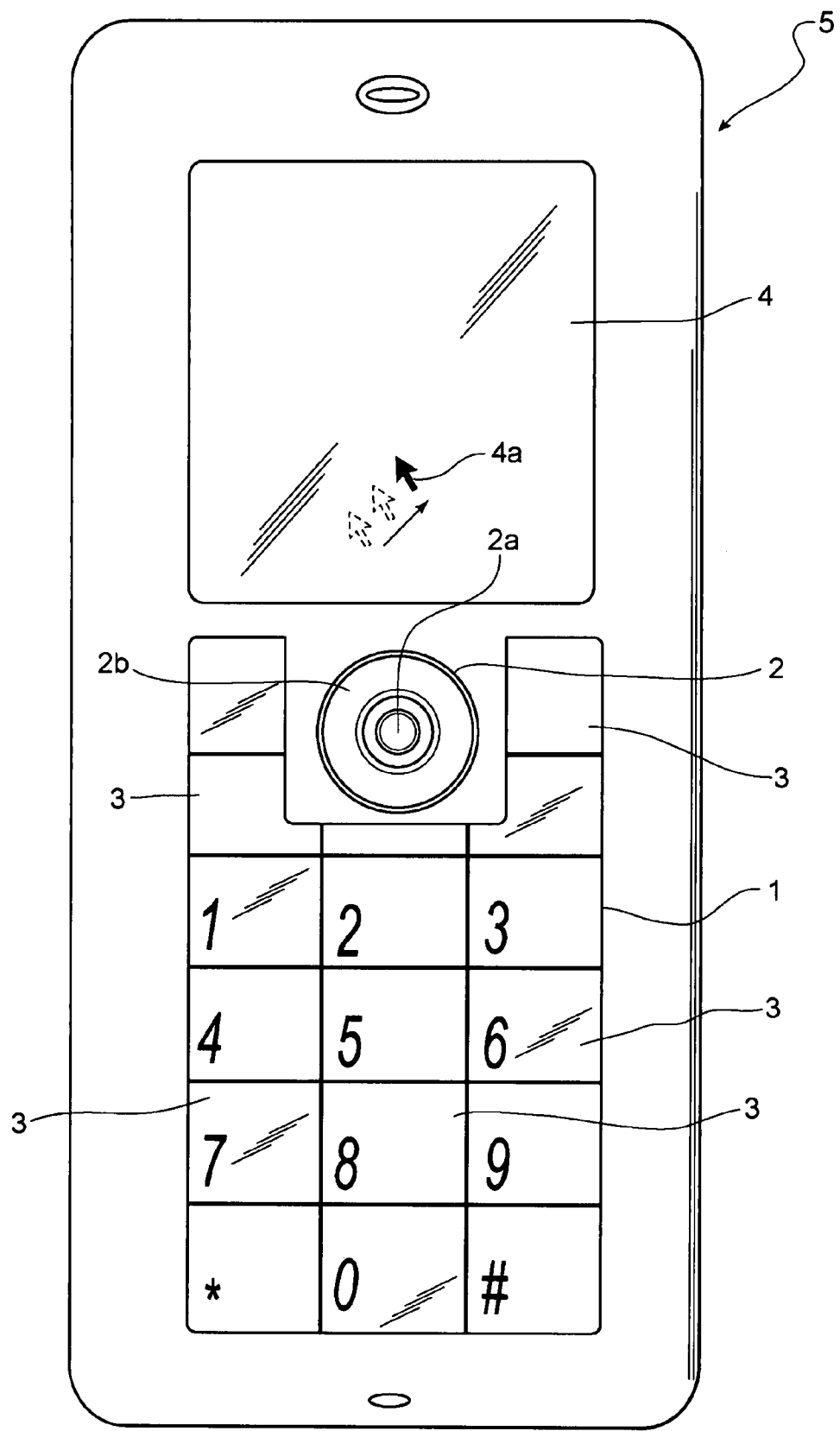
FIG. 1 is a plan view of a portable terminal device such as a portable telephone.
Figure 2:
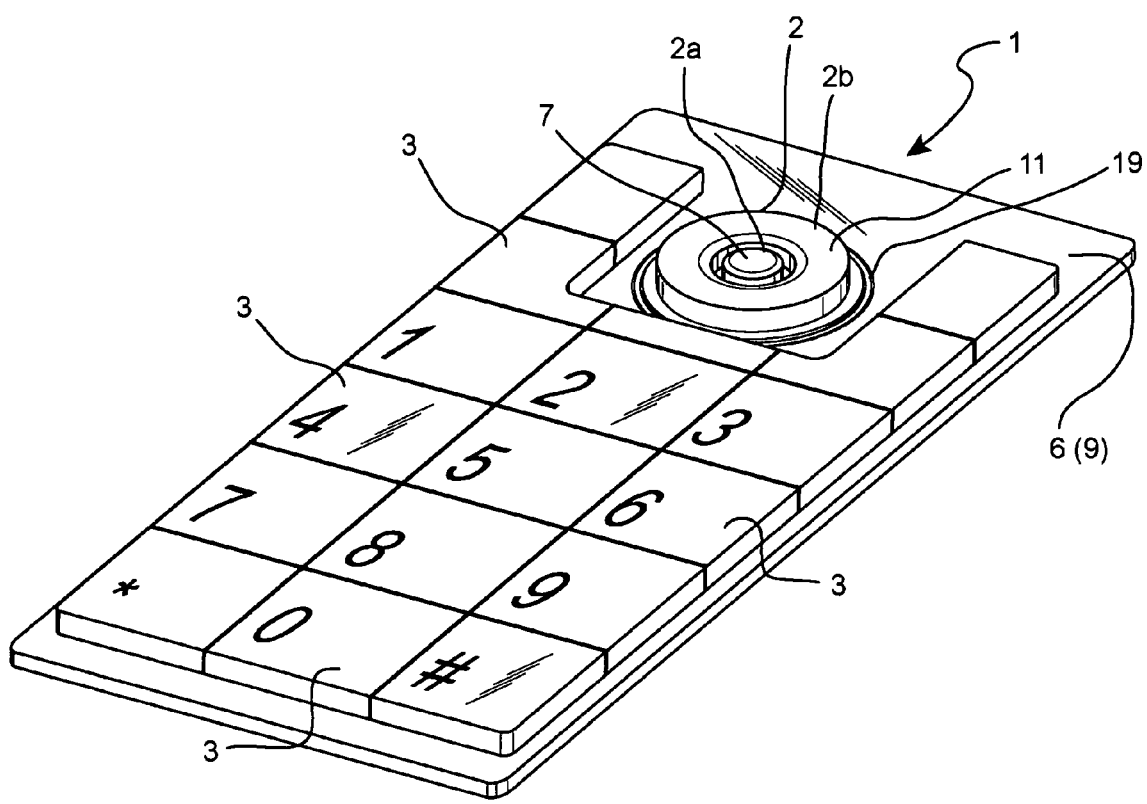
FIG. 2 is a perspective view showing an outline of a direction detecting switch used in the present invention before assembled in the portable terminal device.

FIG. 1 is a plan view of a portable terminal device, such as a portable telephone, in which a direction detecting switch used in an operation direction judging method for an operation key according to the present invention is assembled. FIG. 2 is a perspective view showing an outline of a key sheet 1 on which an operation key of a direction detecting switch, a numeric keypad, various function keys, and so on, are integrally formed, before assembled in the portable terminal device. Reference numeral 2 denotes an operation key as a direction detecting switch; reference numerals 3 denote ten keys and function keys; reference numeral 4 denotes a screen; and reference numeral 5 denotes a portable terminal device. The screen 4 is under the control of a controller 5a (see FIG. 8) of the portable terminal device 5, and has a function that the screen display is switched by an input through the ten keys and function keys 3 or the operation key 2. For example, in the case of using the operation key 2 for moving a cursor key in the screen 4, as shown in FIG. 1, a cursor 4a smoothly moves from a position shown by a broken line to a position shown by a solid line, even in an oblique movement direction. In the key sheet 1, a large number of key tops of the operation key 2 and the ten keys and function keys 3 are provided on a key pad 6 made of a rubber material such as silicone rubber or an elastic material such as a thermoplastic elastomer, into one sheet shape. Not only such a flexible material having rubber-like elasticity, the key pad 6 may be formed integrally with a so-called reinforcing plate made of a metal or various kinds of synthetic resins such as polycarbonate, in order to give rigidity to the keypad and give shape stability to the whole of the key sheet. In addition, other than a case of being molded from a metal or various kinds of synthetic resins into a separate body, each key top may be made of the above-described flexible material having rubber-like elasticity, into an integral form with the keypad 6.

Figure 3:
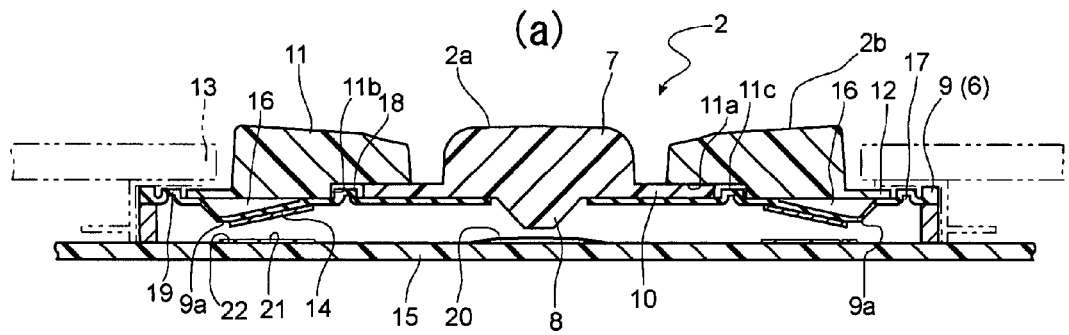
FIGS. 3(a), (b), and (c) are enlarged sectional views showing operation states of an embodiment of the direction detecting switch used in the present invention.
Figure 3:
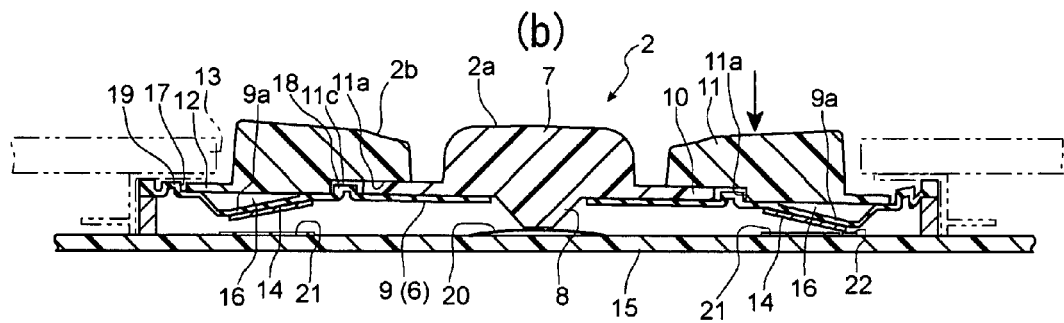
Figure 3:
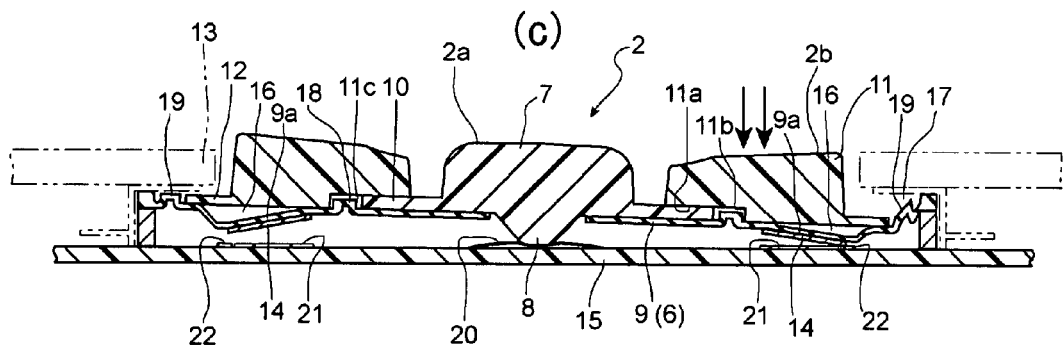
Figure 4:
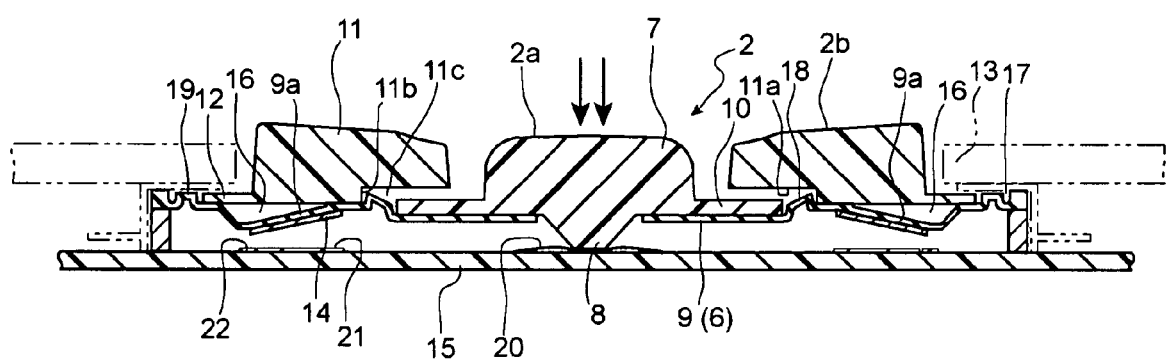
FIG. 4 is an enlarged sectional view showing a state when a determination key is operated in the embodiment of the direction detecting switch used in the present invention.
Figure 5:
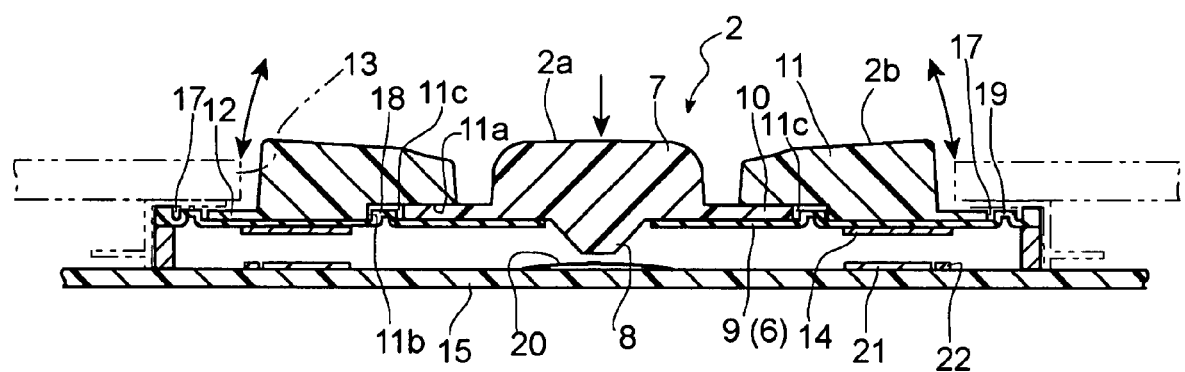
FIG. 5 is an enlarged sectional view showing another embodiment of a direction detecting switch used in the present invention.

FIGS. 3(a), (b), and (c) and FIG. 4 are enlarged sectional views of operation states showing an embodiment of a direction detecting switch including an operation key used in operation direction judging method for an operation key according to the present invention. FIG. 5 shows another embodiment of a direction detecting switch used in a directionality judging method for an operation key according to the present invention. That is, FIG. 5 shows a case wherein a movable electrode and a fixed electrode are arranged substantially in parallel.

The operation key 2 is made up of a determination key 2a disposed at the center, and a ring key 2b disposed so as to surround the determination key 2a. The determination key 2a has at its center a key top 7 made of a hard material such as a hard resin, and a protrusion (pusher) 8 protruding downward, on the back surface of the key top 7. A thin film made of a rubber material such as silicone rubber or an elastic material such as a thermoplastic elastomer or a sheet-like rubber elastic member 9 formed into a proper thickness is adhered to the back surface of the key top 7 other than the protrusion 8. A horizontally projecting flange 10 made of the same material as the key top 7 and formed integrally with the key top 7 is formed on the lower peripheral edge of the key top 7. The sheet-like rubber elastic member 9 is adhered also to the back surface of the flange 10. Although a case wherein the operation key 2 is made up of the determination key 2a disposed at the center, and the ring key 2b disposed so as to surround the determination key 2a is described in this embodiment, the operation key 2 may have a construction in which no determination key 2a is provided.

Figure 6:
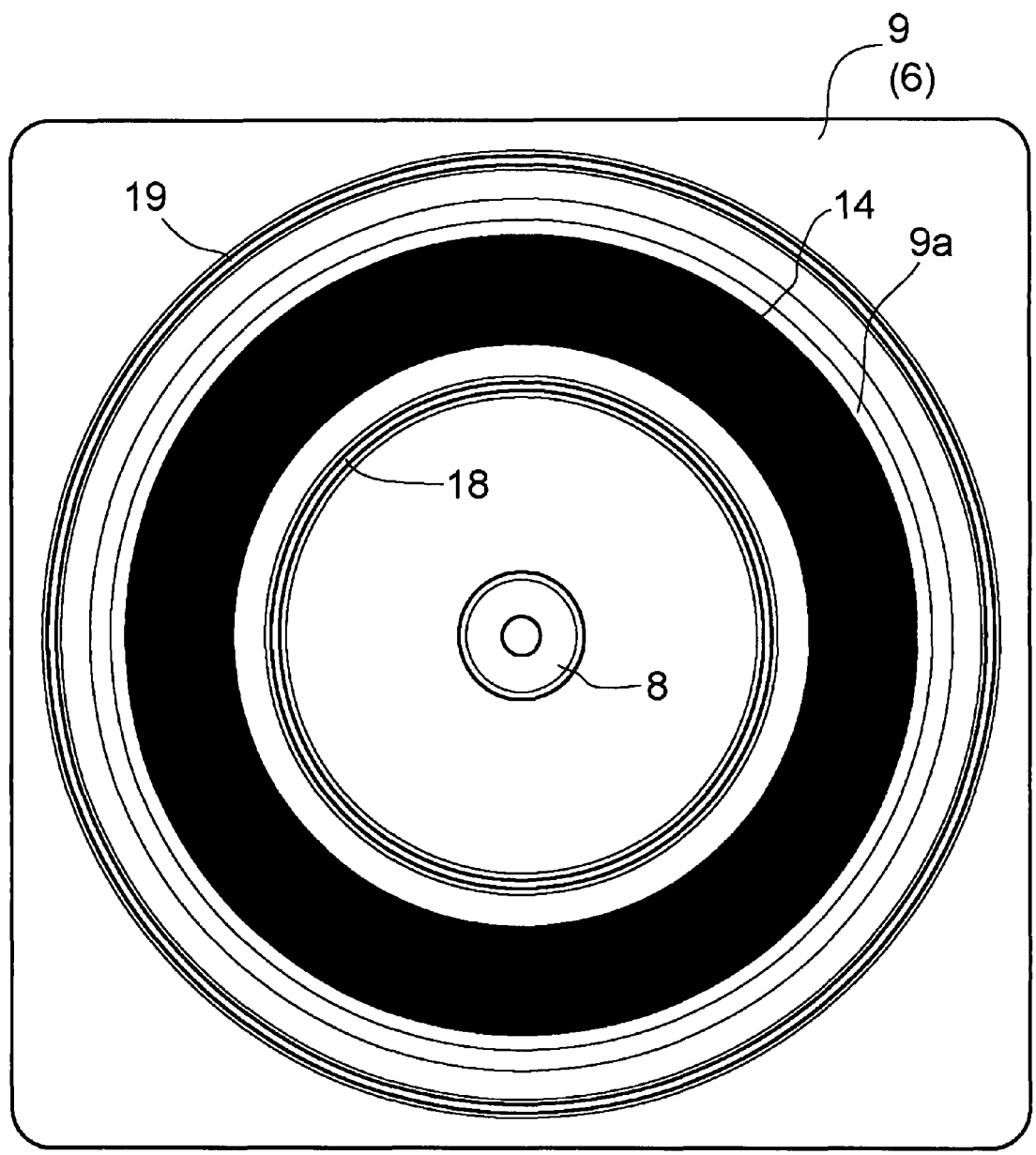
FIG. 6 is an enlarged plan view showing a movable electrode.
Figure 7:
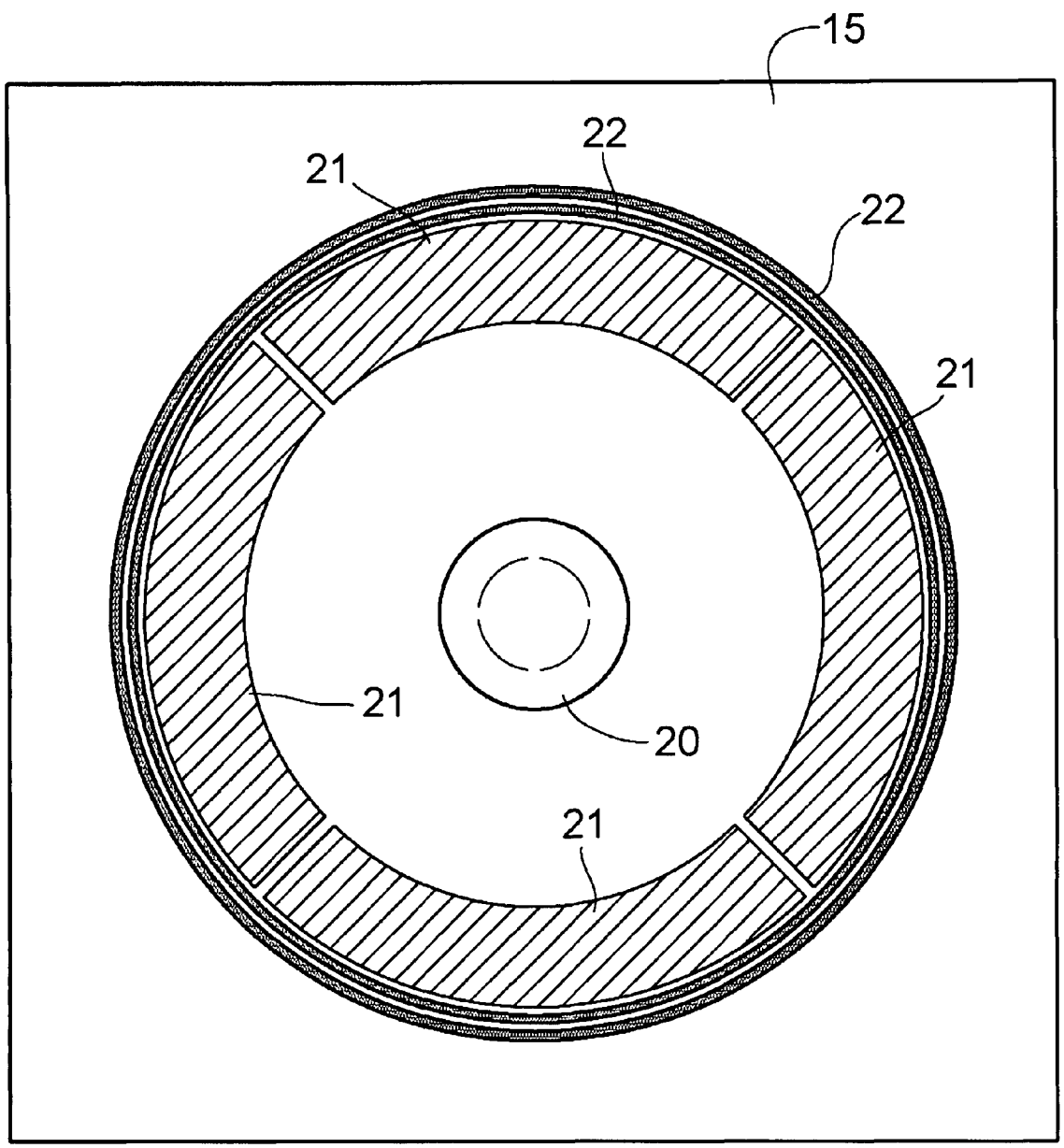
FIG. 7 is an enlarged plan view showing a fixed electrode.
Figure 8:
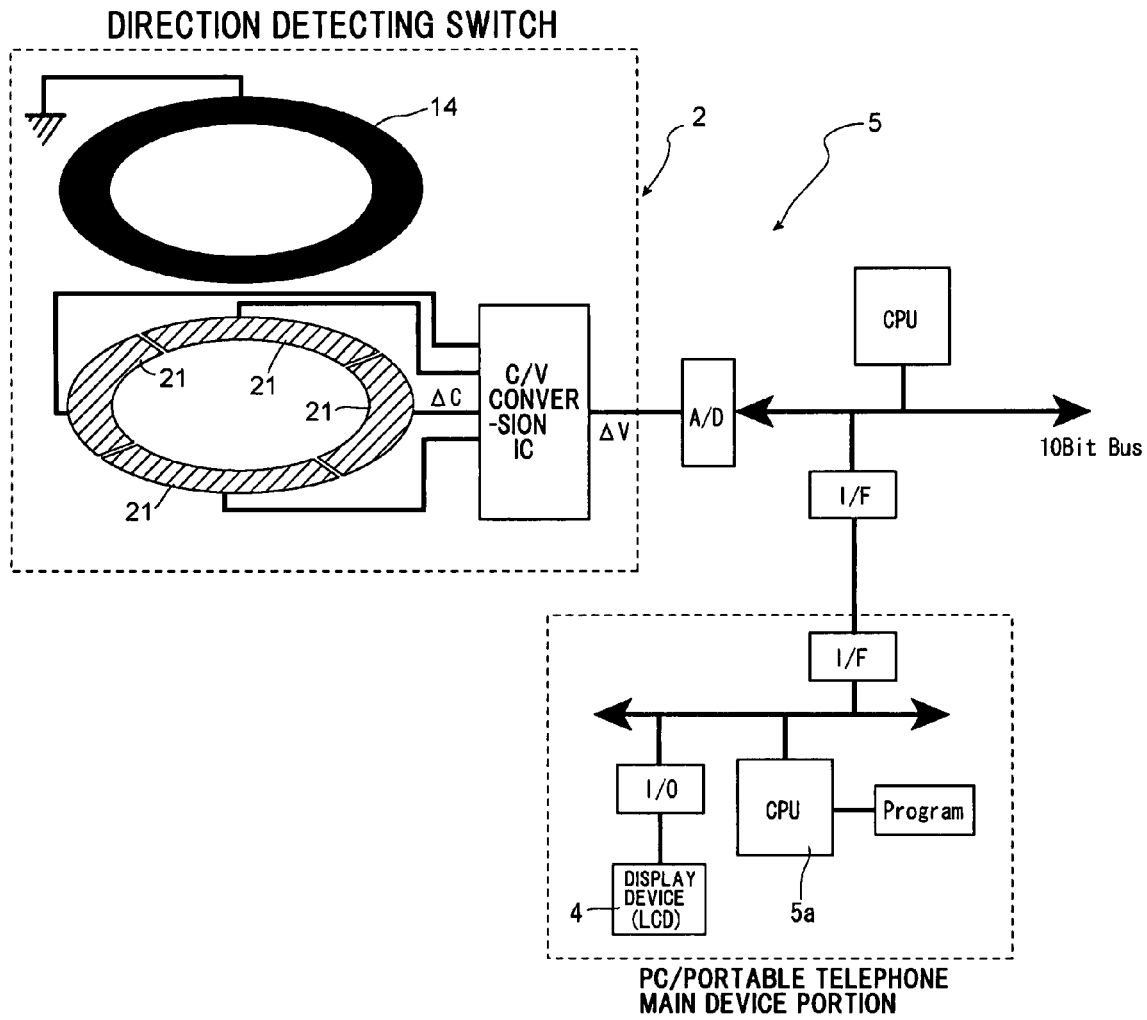
FIG. 8 is a schematic explanatory diagram of a direction detecting switch used in the present invention.
Figure 9:
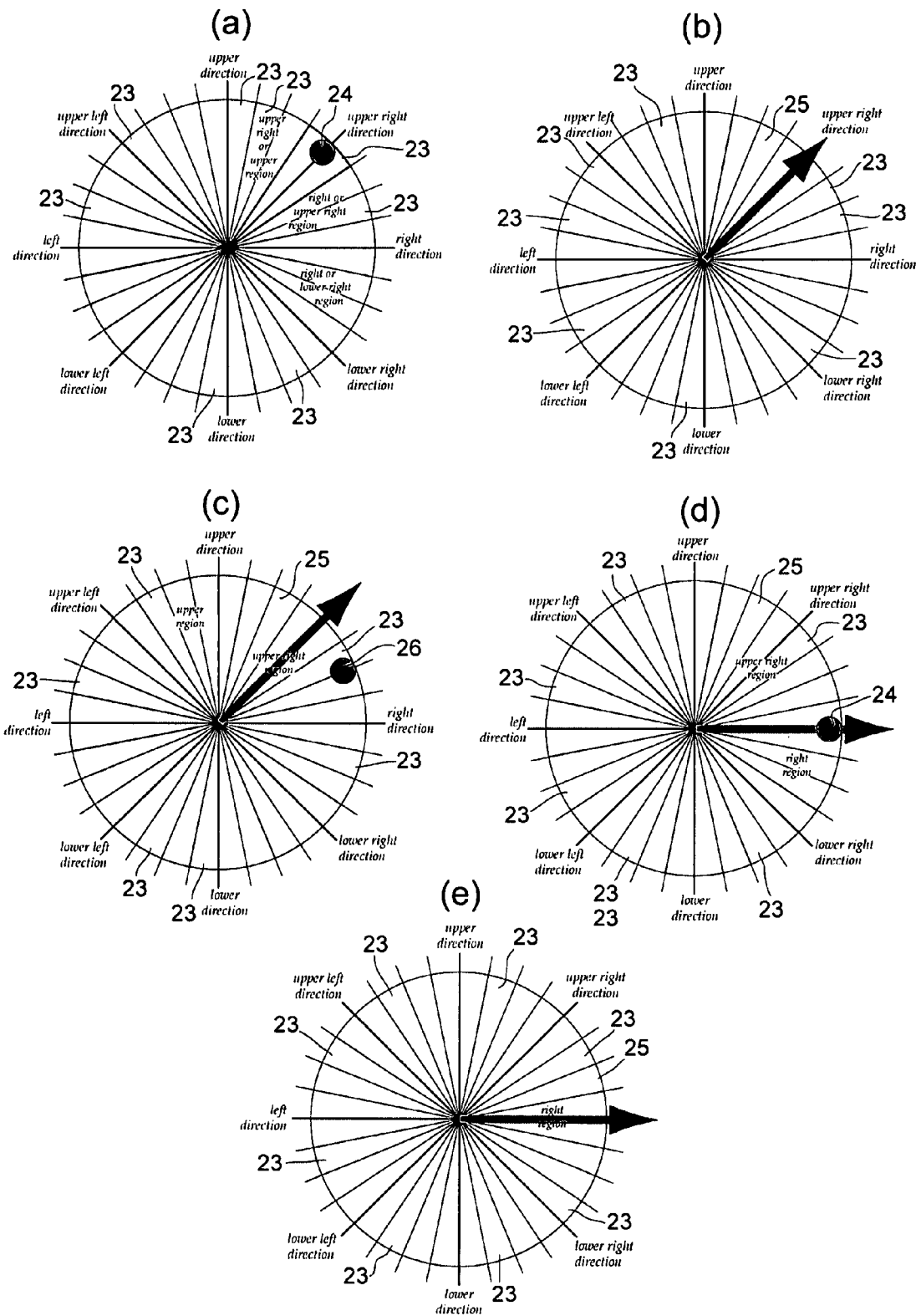
FIGS. 9(a), (b), (c), (d), and (e) are schematic views showing operation directions.

FIG. 6 is an enlarged plan view showing a ring-shaped movable electrode. FIG. 7 is an enlarged plan view showing a fixed electrode corresponding to the shape of the movable electrode and divided in its ring shape into four regions. FIG. 8 is a schematic explanatory diagram of a direction detecting switch used in an operating direction judging method for an operation key according to the present invention.

Reference numeral 11 denotes a ring key top as a constituent element of the ring key 2b, for example, which is made of a hard material such as a hard resin into an annular shape and disposed on the periphery of the determination key 2a to surround the determination key 2a. A flange 12 horizontally protruding beyond the outer lower peripheral edge of the ring key top 11 is formed integrally with the ring key top 11. When an arbitrary portion of the ring key top 11 is pushed, an end portion of the flange 12 of the ring key top 11 at the position just opposite (180 degrees) to the pushed portion is stopped by a stopping member such as an opening edge portion 13 of a case body of the portable terminal device 5 to serve as an inclination fulcrum.

A recess 11a the inside of which is flat via a step portion 11b is formed on the back surface of the ring key top 11. A portion of the flange 10 of the key top 7 of the determination key 2a enters in the recess 11a to make a contact state. A first gap 11c is formed between the end face of the flange 10 and the step portion 11b of the recess 11a. A portion of the sheet-like rubber elastic member 9 (a bent portion 18) bent into a substantially U-shape and formed into a substantially bellows shape is received in the first gap 11c. In the bent portion 18, the bent portion properly spreads out in accordance with depression of the determination key 2a to make the deformation of the sheet-like rubber elastic member 9 smooth. The sheet-like rubber elastic member 9 is bonded to the back surface of the flange 12 with an adhesive or the like; further bent into a U-shape and received in the first gap 11c; in contact with a portion of the flat back surface of the ring key top 11; then forms an inclined portion 9a to gradually get near to a printed circuit board (hereinafter referred to as PCB) 15 so as to form a gap portion 16 between the said inclined portion 9a and the back surface of the ring key top 11; and a bent portion 19 bent into a U-shape and formed into a bellows shape is received in a second gap 17 formed on an extension of the end surface of the flange 12 connected to the inclined portion 9a. In the bent portion 19, the bent portion properly spreads out in accordance with depression of the determination key 2a in an arbitrary direction to make the deformation of the sheet-like rubber elastic member 9 smooth.

Reference numeral 14 denotes a ring-shaped movable electrode provided on the back surface of the inclined portion 9a of the sheet-like rubber elastic member 9 at a position under the back surface of the ring key top 11, for example, which is formed by printing a conductive rubber material or the like on the sheet-like rubber elastic member or by using a proper film formation method of a metallic thin film, such as vapor deposition or sputtering. As shown in FIGS. 3(a), (b), and (c) and FIG. 6, the bent portions 18 and 19 received in the first and second gaps 11c and 17 and bent into a substantially U-shape (a bellows shape) are formed concentrically along the outer periphery of the determination key 2a and the outer periphery of the ring key 2b.

Reference numeral 20 denotes a click operation body capable of clicking operation, such as a metal dome, disposed at a position on the PCB 15 opposite to the protrusion 8. By being pressed, the click operation body 20 put a not-shown fixed contact in a conductive state. As will be described later, the click operation body 20 is deformed to produce click feeling not only in depressing the determination key 2b but also in depressing the ring key 2b. Reference numerals 21 denote four fixed electrodes arranged on the PCB 15 at positions opposite to the movable electrode 14. Like not-shown wiring patterns formed on other portions of the PCB 15, each fixed electrode 21 is made of, for example, copper or the like. Although a case wherein a ring shape is divided into four parts at regular intervals of 90 degrees in a peripheral direction is described in this example, the present invention is not limited to the division into four and may be a division into eight and so on, in accordance with various applications.

In this embodiment, in order to surely detect the quantity of a change in a capacitance value even when the depression stroke of the ring key top 11 is large for operating the click operation body 20 to give click feeling to the operation of the ring key, a structure is adopted in which the interval between the movable electrode 14 disposed on the back surface side of the ring key top 11 and each fixed electrode 21 disposed on the PCB 15 so as to be opposite to the movable electrode 14 can be narrowed. However, the present invention is not limited to that. If the quantity of a change in a capacitance value can be detected even when the interval between the movable electrode and each fixed electrode is wide, as shown in FIG. 5, a structure in which the ring electrode 14 is not inclined, that is, a state wherein the movable electrode 14 and each fixed electrode 21 are disposed parallel to each other and opposite to each other, may be possible.

In addition, although a case wherein the interval between neighboring fixed electrodes 21 is relatively narrow is described in this example, the interval may be properly increased in accordance with application or the like. The surface of each fixed electrode 21 is covered with an insulating film such as a Teflon (trademark) resin film. Reference numerals 22 denote two linear ring electrodes disposed outside of and adjacent to the fixed electrodes 21. When one portion of the ring key top 11 is pressed, the movable electrode 14 is deformed so as to decrease its inclination angle and get near to two linear ring electrodes 22. When an operation of further pressing the ring key top 11 is made, as shown in FIG. 3(b), the movable electrode 14 comes into contact with two linear ring electrodes 22 in an early stage of the operation to makes them conductive and generate an ON signal. When the movable electrode 14 is separated from the linear ring electrodes 22, the conductive state is cancelled. The ON signal due to the conduction is continuously generated during the operation of the ring key 2b.

Next, an operation of the direction detecting switch (operation key) 2 used in an operation direction judging method of an operation key according to the present invention and a judging method of a direction in which the ring key 2a is pressed by an operator, that is, a judging method of operation direction, will be described with reference to FIGS. 3(a), (b), and (c), FIG. 4, and FIGS. 8 to 10.

Upon judging the operation direction of the operation key, description will be made with reference to schematic views of operation directions shown in FIGS. 9(a), (b), (c), (d), and (e). In the below description, by way of example, the direction detecting switch 2 used in a judging method of operation direction of an operation key according to the present invention is used as an eight-direction key of the upper, lower, left, and right directions and the intermediate oblique directions. Even in the case that the operation key 2 is used as a key capable of detecting more than eight directions, the present invention is fundamentally the same.

As shown in FIGS. 9(a) to (e), first, minimum division regions 23 obtained by dividing 360 degrees, for example, equally into thirty two, are set. Two of the minimum division regions 23 constitute one set to be used as the minimum unit. For example, a position on the rightward X-axis is stored as (0,0,0,0,0,0,0,0) in a memory. The first position upper rightward inclined from the position on the rightward X-axis is stored as (0,0,0,0,0,0,0,1); the second position upper rightward inclined from the position on the rightward X-axis is stored as (0,0,0,0,0,0,1,0); . . . ; the inclination angle gradually increases; and a position on the upper Y-axis is stored as (1,0,0,0,0,0,0,0). Hereinafter, the second quadrant to the fourth quadrant are stored in the memory in the same manner. As shown in FIG. 9(a), two minimum division regions 23 are assigned to each of eight directions, and they are set as initial values for operation direction judgment (S1 of FIG. 10).

Next, a case wherein the ring key 2b is pressed, for example, obliquely upper rightward will be described. Setting of each direction by the above initial values is as shown in FIG. 9(a). Reference numeral 24 denotes a pressed portion of the ring key 2b.

When the ring key 2b is depressed, as shown in FIG. 3(b), in an early stage, the movable electrode 14 gets near to the fixed electrode 21 and one end side of the movable electrode 14 comes into contact with two linear ring electrodes 22. Thereby, two linear ring electrodes 22 are made conductive to obtain an ON signal. Using the ON signal as a trigger, for example, as shown in FIG. 8, detection of the quantity ΔC of a change in a capacitance between the movable electrode 14 and each fixed electrode 21 is started. Through a C/V conversion IC, in accordance with the initial setting in a controller (CPU) 5a, an oblique upper right direction assigned to two minimum division regions 23 corresponding to the fourth position (0,0,0,0,1,0,0,0) inclined upper rightward from the position on the rightward X-axis and the fifth position (0,0,0,1,0,0,0,0) inclined upper rightward is judged to be a pressed direction, and (0,0,0,1,1,0,0,0) is set as an oblique upper right direction. As a result, the operation direction of the oblique upper right direction is stored in the memory. In addition, for example, when a cursor on the screen is moved, the cursor on the screen is moved upper rightward (S2 to S3 of FIG. 10).

Figure 10:
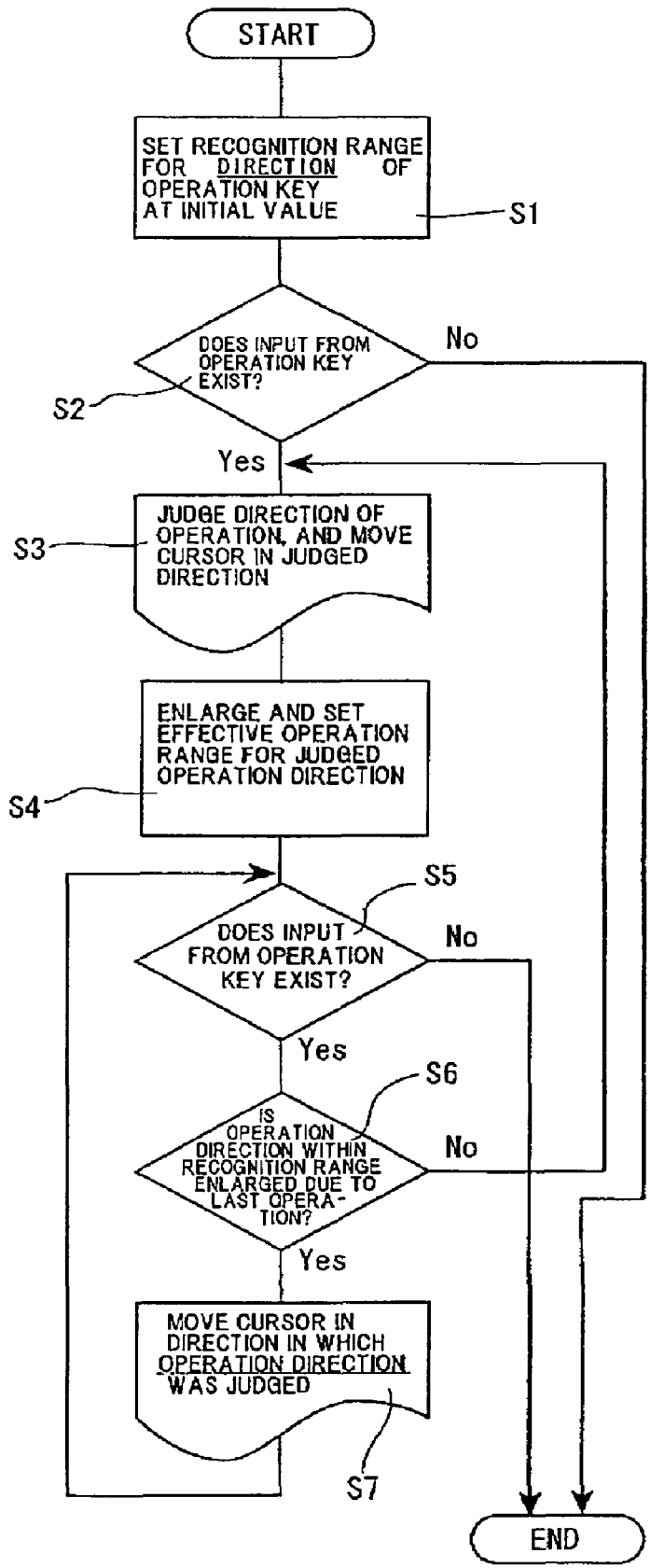
FIG. 10 is a flow sheet showing a procedure for determining operation direction of an operation key of the present invention.

Next, an effective operation range 25 made up of a plurality of regions of the minimum division regions 23, whose center is the minimum division region 23 corresponding to the operation direction of the said operation key (the oblique upper right direction), is set in the controller 5a (see FIGS. 9(b) and S4 of FIG. 10). That is, this means that the region judged to be the oblique upper right direction is enlarged. An operation of the operation key 2 in a state of being within the effective operation range 25 is controlled by the controller 5a so as to indicate the same direction even when any portion within the effective range 25 is pressed. As shown in FIG. 9(c), even if the ring key 2b is pressed at a portion 26 normally as an intermediate portion between the right direction and the oblique upper right direction in the subsequent operation, that portion is within the effective operation range 25 and the operation direction of the operation is judged to be the oblique upper right direction (S6 and S7 of FIG. 10).

For an operation of the operation key at a position which deviates from the above effective operation range 25 (see FIG. 9(d)), an effective operation range for the new operation direction at the deviating position (see FIG. 9(e)) is set in the controller 5a. Namely, for an operation position of the operation key at a position at which the operation key deviates from the said first effective operation range, a direction assigned to the minimum division regions corresponding to the operation position at which the operation key deviates is judged as a second operation direction of the operation key at the deviated operation position, the second effective operation range comprising the above mentioned plural minimum division regions including the judged second operation direction is set in the said controller, and a judgment region judged as the second operation direction is enlarged, an operation direction of the operation key whose operation position is in the second effective operation range is judged to be the same direction to the second operation direction. The above-described procedure for judging the operation direction is carried out on the basis of the flow sheet of FIG. 10. In this way, in a operation direction judging method for a operation key, when a specific operation direction is determined by a depressing operation of the operation key, the effective operation range is automatically set. The same operation direction is maintained as far as the operation key is pressed within the effective operation range. When the operation key is pressed at a position which deviates from the effective operation range, a new operation direction is automatically set, and a new effective operation range whose center is the new operation direction can be automatically set. Thus, the convenience of the operability is increased, and a cursor can be freely moved by one operation key.

Enlargement of the judgment region of the operation direction due to depression of the ring key 2b, such as setting the effective operation range 25 as described above, is desirably performed not only in the direction for which the effective operation range 25 is set, but also, as shown in FIGS. 9(b) to (e), in the just opposite direction shifted by 180 degrees from the direction for which the effective operation range 25 is set (in this case, the oblique lower left direction), or in two directions neighboring the direction for which the effective operation range 25 is set (in this case, the right direction and the upper direction). This is set as the direction high in the probability in the case that the direction which deviates from the effective operation range is operated in the next operation. In addition, in the above effective operation range 25, enlargement into a region forming an angle of about 67.5 degrees is shown. However, the present invention is not limited to that. A region forming 90 degrees at the maximum is set as the effective operation range 25.

When the ring key top 11 is further depressed, as shown in FIG. 3(c), while one end side of the movable electrode 14 is kept in contact with two linear ring electrodes 22, the gap portion 16 is crushed and broken with that portion functioning as a point of action. Thereby, the inclination angle (the angle to the back surface of the ring key 2b) of the inclined portion 9a of the contact sheet-like rubber elastic body 9 is decreased and the inclination angle of the movable electrode 14 is also decreased. The interval between the movable electrode 14 and the fixed electrode 21 is further narrowed, and the quantity of a change in the capacitance generated between the movable electrode 14 and the fixed electrode 21 is caught as ΔC. The quantity ΔC of a change in the capacitance is converted as the quantity ΔV of a change in voltage in the C/V conversion IC, and taken out as a signal (see FIG. 8). In addition, simultaneously with the above-described operation, the click operation body 20 is crushed by the protrusion 8 of the determination key 2a, and the reaction force is conducted to the ring key top 12 to obtain click feeling. The above-described operation is quite the same even when any portion in the peripheral direction of the key top 11 of the ring key 2b is pressed, and simultaneously, click feeling also can be obtained. Although not-shown electrodes on the PCB15 is made conductive by the click operation body 20 being pressed and crushed by the protrusion 8 of the determination key 2a, to generate an ON signal, the signal may be properly used.

When depression of the ring key top is released, the determination key 2a and the ring key 2b returns to the horizontal states shown in FIG. 3(a) by a restoring force causing the bent portion 19 of the sheet-like rubber elastic member 9 that have been spread out by the depression and the elongated portion to return to the original shape, and the inclination angle of the inclined portion 9a of the sheet-like rubber elastic member 9 becomes gentle and the gap portion 16 that have been crushed also returns to the original shape by a restoring force of the inclined portion 9a of the sheet-like rubber elastic member 9.

As described above, disposition of the movable electrode 14 on the inclined portion 9a of the sheet-like rubber elastic member 9 having therein the gap portion 16 between the ring key top 11 and the bottom surface is caused by a structure in which the click operation body 20 originally used for the determination key 2a is used for generation of click feeling upon depressing the ring key. That is, for example, if the necessary stroke for generating click feeling on the click operation body 20 is 0.2 mm, the stroke is 0.4 mm at the portion of the movable electrode 14 in which the distance from the inclination fulcrum is about twice from the position of the click operation body 20. The capacitance is decreased in inverse proportion to the distance between electrodes. Thus, from the characteristic of the sensor that detects the quantity of operation of the ring key 2b from a change in a capacitance, it is because the accuracy is easy to be obtained when the quantity of a change is detected in a state wherein the absolute value of the capacitance is large. Therefore, the distance between electrodes is desirably as short as possible even in the initial state in which no operation is applied. By adopting a construction in which the inclined portion 9a is provided on the sheet-like rubber elastic member 9 and the movable electrode 14 is obliquely disposed therein, conflicting necessary conditions that the distance between electrodes is shortened with keeping the necessary stroke for generating click feeling on the click operation body 20 can be satisfied.

In general, in the case that a change ΔC in a capacitance is detected by changing the interval between mutually opposite electrodes, the detected capacitance value is small when the distance between the electrodes is wide, and large when the interval between the electrodes is narrow. Even in shifting from the state shown in FIG. 3(a) to the state shown in FIG. 3(b), it is possible to detect the capacitance between the movable electrode 14 and the fixed electrode 21. In an example of this embodiment, however, only the quantity ΔC of a change in a capacitance when and after one end side of the movable electrode 14 comes into contact with two linear ring electrodes 22 and an ON signal is detected is processed.

In addition, when the determination key 2a of the operation key 2 is operated (pressed), the ring key top 11 of the ring key 2b is not displaced. As shown in FIG. 4, only the key top 7 of the determination key 2a is moved just below, and its protrusion 8 presses and crushes the click operation body 20 on the PCB 15, and not-shown electrodes on the PCB 15 are made conductive to generate an ON signal.

The present invention relates to operation direction judging method for an operation key in a direction detecting switch used in a portable terminal device, such as a portable telephone, or another electronic terminal device, and a new directionality judging method for an operation key in which a change in a capacitance is detected by operating an operation key omnidirectionally of 360 degrees; the operation direction is specified; the same direction is indicated even when any portion is pressed within an effective operation range whose center is the operation direction; a new operation direction is specified when the operation key at a position which deviates from the effective operation range is pressed; and a new effective operation range can be dynamically displaced with the new operation direction being set as the center.

What is claimed is:

1. An operation direction judging method for an operation key in a direction detecting switch, comprising a movable electrode disposed so as to be movable in accordance with an operation of an omnidirectionally operable operation key; and fixed electrodes dividedly disposed so as to be opposite to the movable electrode; direction detection information on the operation direction and the operation speed of the operation key being obtained by detecting as an input signal a capacitance between the movable electrode and the fixed electrodes, wherein:

360 degrees are divided into plural minimum division regions as a criterion for judging the operation direction of the operation key from the said input signal, an initial value for judging the operation direction of the operation key is set assigning the direction to the said divided minimum division regions, an operation position of the operation key is detected from the input signal, a direction assigned to the minimum division regions corresponding to the said detected operation position at the initial value is judged as a first operation direction operated by the said operation key, the said first operation direction is stored in a memory, next, the first effective operation range comprising the plural minimum division regions obtained by dividing 360 degrees including the first operation direction is set in a controller, and the judgment region judged as the first operation direction is enlarged;

an operation direction of the operation key whose operation position is in the first effective operation range is judged to be the same direction to the first operation direction stored in the said memory;

and for an operation position of the operation key at a position at which the operation key deviates from the said first effective operation range, a direction assigned to the minimum division regions corresponding to the operation position at which the operation key deviates is judged as a second operation direction of the operation key at the deviated operation position, the second effective operation range comprising the above mentioned plural minimum division regions including the judged second operation direction is set in the said controller, and a judgment region judged as the second operation direction is enlarged, an operation direction of the operation key whose operation position is in the second effective operation range is judged to be the same direction to the second operation direction.

2. The operation direction judging method for an operation key in a direction detecting switch of an operation key according to claim 1, wherein directions that the said direction detecting switch recognizes are eight directions of upper, lower, left and right directions and intermediate directions of them, and the said effective operation range is a region of an angle of less than 90 degrees at the maximum.

3. The operation direction judging method for an operation key in a direction detecting switch according to claim 1 or 2, wherein the said second effective operation range is set around the said second operation direction.

4. The operation direction judging method for an operation key in a direction detecting switch according to claim 1, wherein also in a direction 180 degrees opposite to the said first effective operation range, the third effective operation range comprising plural minimum division regions including direction 180 degrees opposite to the said first operation direction is set in the said controller, and a judgment region judged as the direction 180 degrees opposite to the said first operation direction is enlarged, an operation direction of the operation key whose operation position is in the third effective operation range is judged to be the same direction to the direction 180 degrees opposite to the first operation direction.

* * * * *